United States Patent [19]

Neary

[11] 3,897,648
[45] Aug. 5, 1975

[54] DIVING PLANE FOR FISHING

[76] Inventor: Joseph F. Neary, 1440 Cambridge, Novato, Calif. 94947

[22] Filed: Sept. 16, 1974

[21] Appl. No.: 506,207

[52] U.S. Cl. ............................ 43/43.13; 43/43.12
[51] Int. Cl. ......................................... A01k 95/00
[58] Field of Search .............. 43/43.13, 43.12, 42.04

[56] References Cited
UNITED STATES PATENTS

| 2,932,115 | 4/1960 | Dunn | 43/43.13 |
| 3,341,966 | 9/1967 | Pippen | 43/43.12 |
| 3,643,370 | 2/1972 | Cook et al. | 43/43.12 |

Primary Examiner—Warner H. Camp

[57] ABSTRACT

An apparatus for use in trolling for fish incorporating the combination of a release member connected serially in the fish line between the fish hook tackle and the line and incorporating a diving platform connectable to the release member and the fish line in the first position so that when trolling the platform is held at an angle which will cause the platform to dive to predetermined depths and operable upon pressure being exerted by a fish on the end of the line to release the platform from its diving angle; said diving platform incorporating a planar member having the lead end pivotally connected to the fish line and one end of the release member by a rigid spacer and having a bifurcated trailing face in which the release member is releasably connected to the platform at the web of the bifurcation of the planar member; by this means during the period of connection of the release member with the planar surface, the planar member is held in an angular position to cause it to dive and upon release thereof into the second position will allow the planar member to trail in a non-diving orientation.

4 Claims, 6 Drawing Figures

PATENTED AUG 5 1975 3,897,648
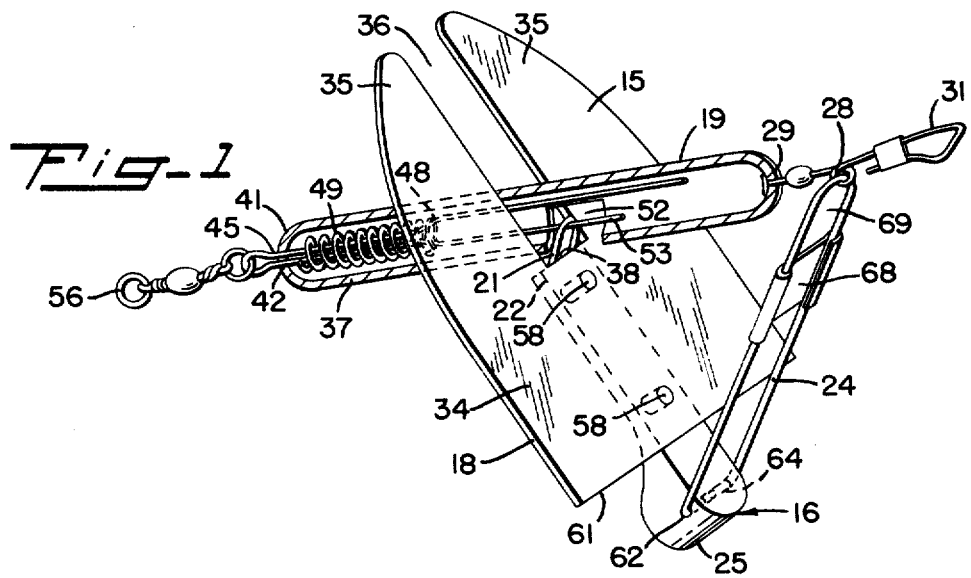
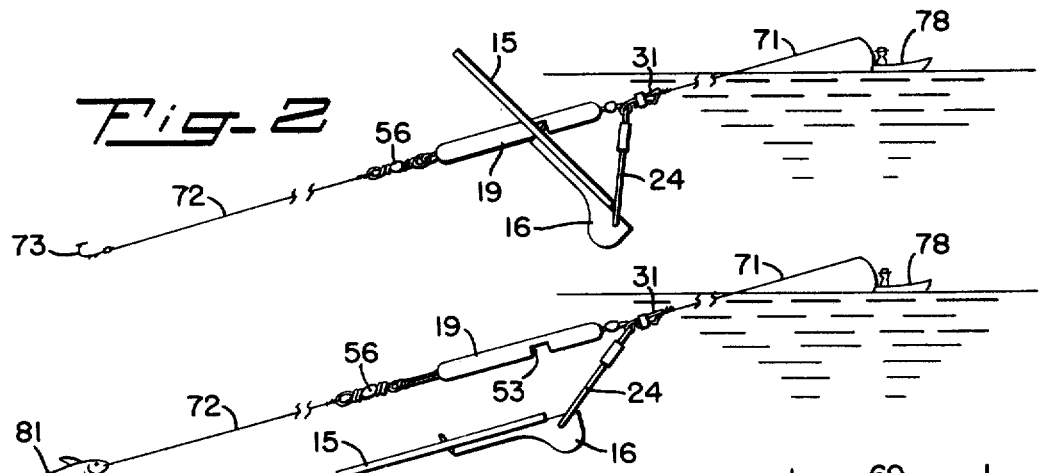
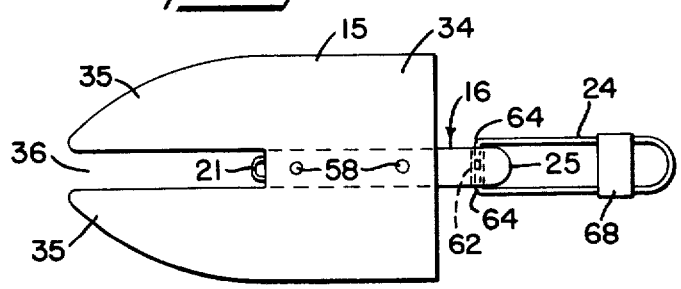
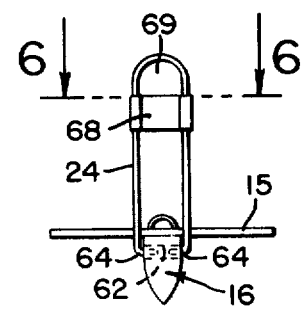

DIVING PLANE FOR FISHING

OBJECTS AND ADVANTAGES

For troll fishing in which it is desirable to bring the bait and tackle to relatively deep levels, it has been the practice in the past to carry substantially heavy weights by the fishing line so that the tackle will be gravity urged to the required depths, however in such applications after the strike or capture of the fish, the weight becomes an unaccepted encumberance in retrieving the fish. Consequently the standardized procedure includes a mechanism which would releasably detach the weight from the line when the fish exerts pressure against the tackle, thus freeing the line of the weight for playing and retrieving the fish.

A common device which has previously been used for this purpose, and which constitutes a component of the present invention, includes a device commonly known as a "sinker release". Such releases are normally comprised of a tubular member connected at one end to the fishing line and having a reciprocally mounted pin connected at the other end of the tubular member and to the fishing tackle, i.e., such as hooks, spinners, and the like. A cut out is formed in the tubular member in which the reciprocating member transverses to carry the weight in one position, and when pressure is exerted on the reciprocal member, the reciprocating member is removed from the cut out portion to cause release of the weight. A spring of appropriate tension is mounted within a tubular member and arranged to exert appropriate pressure against the reciprocating member to bias it in a position to normally retain the weight. Thus in the normal fishing application, the sinker release normally holds the weight on the line and will react to release the weight upon the strike of a large enough fish to overcome the spring tension.

One of the principal disadvantages of such a system is the obvious loss of weights each time there is a strike. Weights are obviously costly and sometimes inaccessible. There have also been a number of devices in which a diving member has been connected in the line of a trolling fishing line so that the hydraulic pressure against the member forces the member to dive due to the forward motion of the trolling vehicle. Such devices have also incorporated a mechanism for the operation of the diving member when force is exerted at the tackle end of the line to change it from a diving to a non-diving mode, in view of this fact it is unacceptable for the diving mode to be continued when attempting to bring in or capture a fish.

In the present device, a new and improved diving plane is arranged in combination with a device such as a conventional sinker release in such a way that the sinker release can operate with stress and strength properties in the same fashion as was previously employed using weights. In the present invention however, the sinker release member is adapted in a first condition to hold the midportion of a diving platform during a trolling operation. In this condition a spacer member connected to the forward end of the sinker release positions the diving platform to a diving position so that the device will dive via the water flow across the platform. Upon the strike of a fish, the platform is released at the midportion so that the platform merely trails from the device in a non-diving relationship.

A feature of the present invention lies in the fact that the diving platform is retained with the line after a strike thus eliminating costly weights and the like.

A further advantage in this invention lies in the fact that the conventionally known and proven advantage of the conventionally used sinker release is utilized.

As a further feature of the present invention, the point of purchase of the sinker release to the diving platform is mounted between the leading end and the trailing edge of the platform to provide a balanced hydraulic action. This is accomplished through the bifurcated trailing edge construction of the platform and through the slot formed by the bifurcation which allows a connecting pivot at a point on the plane of the platform which is substantially midway between the forward and trailing edge. The slot also provides the entry and exit for the sinker release.

A further feature and advantage of the present invention has been found to provide stability in both the diving angle and the lateral movements of the device. This is important in as much as many previously used devices have a tendency to wobbulate or move to the right or the left during the trolling application. In the present device, due to the balanced connection point, the device is held in a stable condition.

The present invention further incorporates a weighted keel mounted on the bottom face of the diving platform which uniquely provides a pivotal connection for the forward spacer and the forward end of the sinker release and provides a mounting mechanism for receiving the sinker release at the trailing end of the keel to thus facilitate a simple construction.

These and other features and advantages of the present device will become apparent in further references to the description and the drawings. For further detail of the invention reference is made to the drawings.

DESCRIPTION OF DRAWINGS

FIG. 1 is a perspective view showing the sinker release connected to the platform in a diving situation.

FIG. 2 is a diagrammatic view showing the interrelationship of the trolling vehicle during a diving trolling condition.

FIG. 3 is a diagrammatic similar to FIG. 2 in which the diving platform is out of the diving condition due to the pressure caused by the strike of a fish.

FIG. 4 is a top plan view of the platform and spacer.

FIG. 5 is a front view of the platform and spacer.

FIG. 6 is a cross sectional view of the spacer lock taken at line 6—6 of FIG. 5.

DETAILED DESCRIPTION OF DRAWINGS

The apparatus of this invention includes a diving platform 15 having a weighted lead keel 16 mounted on the bottom face 18 of the platform. A release member 19 for connecting to a loop 21 carried by the trailing end 22 of keel 16. A spacer member 24 pivotally connected to the forward end 25 of keel 16 and to a connector 28 on the forward end 29 of release 19 is arranged to form a triangle which will hold the plane 15 in a diving angle as seen in FIG. 2 when the device is pulled via its attachment to a connecting snap 31 also connected to loop connector 28.

Platform 15 is formed with a forward planar area 34, a bifurcated trailing surface which defines a pair of flukes 35 separated by a slot 36 to allow entry and exit of release member 19. This allows release member 19 to be releasably connected to loop or ring 21 at the end of web 38 of slot 36.

Release member 19 is a standard item of commerce, and is a conventional design, and specifically incorporates a tubular housing 37 closed at both ends having connected to the forward end 29, the connector 28. The trailing end 41 of release member 19 is appertured at 42, through which a cotter key shaft 45 is reciprocally mounted for sliding movement relative to the apperture. The cotter key shaft member 45 is bent to form a stop 48 against which a spring 49 is compressed. The midsection of housing 37 is cut to form a cutout 52 through which the release shaft portion 53 of the cotter key shaft 45 is arranged to form a releasable lock for engagement with ring 21. It can thus be seen as pressure is applied on the trailing end tackle connector 56 connected to the cotter key shaft 45 that a release from ring 21 is affected. Keel member 16 is connected by rivets 58 to the bottom of plane 15 so that the forward end 25 projects beyond the forward edge 61 of the platform. Bearing 62 is mounted to pivotally receive inwardly project shafts 64 of spacer member 24. The spacer member 24 is held in compression by clip 68 which holds the two shafts 64 in locked engagement in bearing 62. The clip member also provides a stop to hold loop 28 at the upper extension area 69 of the spacer member.

In operation a fish line 71 is connected to connector 31 and the tackle including leader 72 and hooks 73 is connected to the connector 56. Shaft 45 is manually withdrawn. Release member 19 is then inserted through slot 36 and aligned so upon release of shaft 45 shaft portion 53 passes through loop 21. In this condition the device is arranged as shown in FIG. 1 and FIG. 2.

The device is then propelled via a boat or other vehicle 78. As the boat 78 progresses through the water, hydraulic pressure against the surface of the plane 15 causes the device to dive. Weight of keel 16 maintains the upright orientation so that the angular relationship as shown in FIG. 2 is maintained. In this condition the diving depth is determined by the length of line 71 which is let out and to some extent the velocity or speed of the boat 78.

It can be seen that as the device gets down to predetermined depths with a predetermined length of line, that the angle of plane 15 will flatten to a point where further diving is resisted, thus the device will find a depth which is determined by the length of line 71 and the dimensions of the triangle formed by spacer 24, sinker release 19, and the space between loop 21 of the bearing 62. In normal operation the aforesaid triangle is a fixed dimension so that the only variable in practical operation will be the length of line 71. Thus it can be seen that the depth can be readily controlled simply by letting out or taking in the amount of line 71.

When a fish 81 takes the hook 73, pressure is applied to shaft 41 to overcome the spring pressure 49 and thereby releases shaft portion 53 from ring 21. Under these circumstances plane 15 then falls free of release 19 as shown in FIG. 3 but is held in connection to the line in free flowing fashion by spacer 24. Under these circumstances the device offers no diving action and is simply free to trail with the line so that fish 81 can be played without encumberance of diving action.

While spacer 24 has been shown as a fixed dimension it is obvious that the spacer can be lengthened or shortened to change the diving angle if desired. It is also apparent that while release 19 has been shown to a specific structure according to conventional commercial design, other structures which incorporate a longitudinally actuatable release action which could be used.

As can be seen in FIG. 3, the entire transmission of forces occurs through the release mechanism 19 and the plane 15 therefore functions in no way to form a connection between the line 71 and the fishing tackle leader 72. This has the advantage of eliminating rotation or wobbulation of the line due to transmittal of forces that might occur where the force to be transmitted through plane 15 as is done in certain prior devices.

Another important operational feature of the device lies in the fact that the pivotal movement formed by the triangle is formed to provide a balanced hydraulic condition. This occurs because the flukes 35 apply rotational force which is opposite to the rotational force that applies to the base portion 34 on the leading end portion of the plane. This creates a balanced condition which prevents wobbulation and directional changes which could cause the device to move from side to side during operation.

It is also noted that lateral directional stability is provided by the longitudinal keel shape of keel 16. It is further noted that because the weight extends beyond the forward surface 61 that the leverage is such as to gain maximum gravitational balance with a smaller amount of weight.

I claim:

1. A diving apparatus for use in troll fishing comprising; a release member connectable serially between the leading and trailing end of a fish line, a planar diving platform being formed with a base area and a pair of flukes separated to form a slot with a web formed by the base between said flukes, a loop connector mounted to said platform at said web between said flukes, said release member having a first end connectable to said leading end of said fish line and a second and connectable to said trailing end of said fish line, means on said release member located between said first and second ends to releasably connect said member to said loop connector, a spacer member pivotally connected to the first end of said release member, and to said diving platform weight means mounted on the bottom of the leading end of said platform, and means within said release member for releasing the connection to said loop when a predetermined pressure exists between said first and second end of said release member.

2. A diving apparatus in accordance with claim 1 and wherein said weight member extends beyond the edge of said platform and a bearing is carried by said weight member and wherein said spacer member is pivotally mounted to said bearings.

3. A diving apparatus in accordance with claim 1 and wherein said weight member extends beyond the edge of said platform and a bearing is carried by said weight member and said spacer member is pivotally mounted to said bearing, said spacer member being formed by a looped member formed to have two shaft ends mounted within said bearing and a clip member mounted around said looped member urging said shaft members into engagement with said bearings.

4. A device according to claim 1 and wherein the trailing end of said weight member is aligned with the web of said platform and the lead end extends beyond the lead end of said platform, said loop connector being mounted directly to said trailing end of said weight member and said spacer being pivotally mounted to the portion of said weight member extending beyond the base of said platform.

* * * * *